United States Patent [19]
Abramson et al.

[11] Patent Number: 5,751,983
[45] Date of Patent: May 12, 1998

[54] OUT-OF-ORDER PROCESSOR WITH A MEMORY SUBSYSTEM WHICH HANDLES SPECULATIVELY DISPATCHED LOAD OPERATIONS

[76] Inventors: Jeffrey M. Abramson, 6537 SW. Hoffert Pl., Aloha, Oreg. 97007; David B. Papworth, 20101 SW. Schools Ferry Rd., Beaverton, Oreg. 97007; Haitham H. Akkary, 17840 NW. Anastasia Dr., Portland, Oreg. 97229; Andrew F. Glew, 1038 NE. 21st Ave., No. 24, Hillsboro, Oreg. 97124; Glenn J. Hinton, 6130 NW. 185th Ave.; Kris G. Konigsfeld, 17937 NW. Anastasia Dr., both of Portland, Oreg. 97229; Paul D. Madland, 7905 SW. Carol Glen Pl., Beaverton, Oreg. 97007

[21] Appl. No.: 538,594

[22] Filed: Oct. 3, 1995

[51] Int. Cl.⁶ ............................................... G06F 3/38
[52] U.S. Cl. ........................................ 395/392; 395/393
[58] Field of Search ................................. 395/392, 382, 395/393

[56] References Cited

U.S. PATENT DOCUMENTS

| | | | |
|---|---|---|---|
| 4,916,652 | 4/1990 | Schwarz et al. | 364/748 |
| 5,125,083 | 6/1992 | Fite et a. | 395/383 |
| 5,150,470 | 9/1992 | Hicks et al. . | |
| 5,163,139 | 11/1992 | Haigh et al. . | |
| 5,168,547 | 12/1992 | Miller et al. | 395/821 |
| 5,197,130 | 3/1993 | Chen et al. | 395/585 |
| 5,208,914 | 5/1993 | Wilson et al. | 395/859 |
| 5,226,130 | 7/1993 | Favor et al. | 395/585 |
| 5,241,633 | 8/1993 | Nishi . | |
| 5,261,071 | 11/1993 | Lyon | 395/467 |
| 5,353,426 | 10/1994 | Patel et al. | 395/445 |
| 5,363,495 | 11/1994 | Fry et al. | 395/555 |
| 5,388,222 | 2/1995 | Chisvin et al. | 395/481 |
| 5,396,603 | 3/1995 | Tamaki et al. . | |
| 5,404,552 | 4/1995 | Ikenaga | 395/800.41 |
| 5,420,991 | 5/1995 | Konigsfeld et al. | 395/477 |
| 5,467,473 | 11/1995 | Kahle et al. | 395/800.23 |
| 5,522,052 | 5/1996 | Inoue et al. . | |
| 5,553,256 | 9/1996 | Fetterman et al. . | |
| 5,564,029 | 10/1996 | Ueda et al. . | |
| 5,625,837 | 4/1997 | Popescu et al. . | |
| 5,627,982 | 5/1997 | Hirata et al. | 395/382 |

OTHER PUBLICATIONS

Sohi; "Instruction Issue Logic for High–Performance, Interruptible, Multiple Functional Unit, Pipelined Computers" IEEE Transactions Computers, vol. 39, No. 3, Mar. 1990.
The Metaflow Architecture, IEEE Micro, Jun. 1991, pp. 10–13, 63–73.
Detecting Violations Of Sequential Consistency, Kourosh Gharachorloo & Phillip B. Gibbons, pp. 1–11.
Reasoning About Parallel Architectures, William W. Collier. Prentice Hall 1992, 233 pages.
Superscalar Microprocessor Design, by M. Johnson, Prentice Hall (1991).
Profiling the Cyrix 5×86 (nee M1sc or M9), by Martin Reynolds, 1995 Data Request Inc.

*Primary Examiner*—Krisna Lim

[57] ABSTRACT

A method and apparatus for speculatively dispatching and/or executing LOADs in a computer system includes a memory subsystem of a out-of-order processor that handles LOAD and STORE operations by dispatching them to respective LOAD and STORE buffers in the memory subsystem. When a LOAD is subsequently dispatched for execution, the store buffer is searched for STOREs having unknown addresses. If any STOREs are found which are older than the dispatched LOAD, and which have an unknown address, the LOAD is tagged with an unknown STORE address identification (USAID). When a STORE is dispatched for execution, the LOAD buffer is searched for loads that have been denoted as mis-speculated loads. Mis-speculated loads are prevented from corrupting the architectural state of the machine with invalid data.

26 Claims, 10 Drawing Sheets

OUT-OF-ORDER PROCESSOR WITH A MEMORY SUBSYSTEM WHICH HANDLES SPECULATIVELY DISPATCHED LOAD OPERATIONS

FIELD OF THE INVENTION

The present invention relates to the field of computer systems; more particularly, to speculative execution of operations in computer systems.

BACKGROUND OF THE INVENTION

Traditionally, computers have processed instructions one at a time, with the processing of each instruction normally comprising four sequential stages: instruction fetch, instruction decode, execute, and result writeback. Within such computing machines, different dedicated logic blocks performed the various sequential stages separately such that each associated logic block had to wait until all previous logic blocks had completed their operations before it could begin its own operation.

To improve data processing efficiency, most modern microprocessors overlap the operations of the fetch, decode, execute, and writeback stages so that the microprocessor can operate on several instructions simultaneously, thereby increasing instruction throughput. According to this technique, known as "pipelining", the fetch, decode, execute, and writeback stages are overlapped, with the results of each processing stage being passed to the following processing stage during each clock cycle.

For pipelined microprocessors to operate efficiently, an instruction fetch unit at the front of the pipeline must provide a continuous stream of instructions. One problem that arises, however, is that conditional branch instructions prevent the instruction fetch unit from fetching the proper instructions until the condition has been resolved further down the pipeline. A common solution to this problem is the use of branch prediction mechanisms which fetch subsequent instructions according to the predicted branch.

Branch prediction is often achieved using a branch target buffer that stores the history of a branch instruction based upon the instruction pointer or address of a particular instruction. By way of example, every time a branch instruction is fetched, the branch target buffer attempts to predict the target address of the branch utilizing the instruction's branch history. Various branch prediction mechanisms are discussed in two articles by Yeh et al.: *Two-Level Adaptive Branch Prediction*, 24th ACM/IEEE International Symposium and Workshop on MicroArchitecture, Nov. 1991; and *Alternative Implementations of Two-Level Adaptive Branch Prediction*, Proceedings of the 19th International Symposium on Computer Architecture, May 1992.

Recently, researchers have proposed increasing instruction throughput by combining speculative execution with out-of-order dispatch of instructions to multiple execution units. In this approach, any number of instructions are allowed to be in execution up to the total number of pipeline stages in all the functional units. Instructions may execute out of their original program order since instruction dispatch is not stalled when a functional unit takes more than one cycle to compute a result. Hence, a functional unit may often complete a first instruction (which logically precedes a second instruction in the program instruction ordering) after the second instruction has already been executed. A processor architecture which attempts to increase instruction throughput using this approach is described in the book *Superscalar Microprocessor Design*, by M. Johnson, Prentice Hall (1991).

Implementing a processor architecture such as that described in Mr. Johnson's book involves overcoming numerous difficulties. Just one example of the many difficulties that must be overcome is the problem of how to correctly process memory instructions. For instance, memory instructions may be decoded into LOADs and STOREs and then buffered, either separately or in a central memory reservation station, awaiting execution. The LOADs and STOREs are then executed once their source operands have been computed and execution units are available. One of the constraints that arises on execution ordering is that STOREs must be performed only after all preceding instructions have completed successfully since the result of a STORE operation is to overwrite a memory location which may store an instruction or data needed for a subsequent operation. This means that STOREs must be executed in normal program order with respect to both STOREs and LOADs so as to prevent speculative caching and premature overwriting of a value that may be needed by a preceding LOAD. On the other hand, LOADs may, in some instances, be executed out-of-order with respect to STOREs.

One way in which a subsequent (i.e., younger) LOAD can be executed out-of-order with respect to a preceding (i.e., older) STORE is the provision of a separate store buffer for buffering STORE operations after address computation has been completed. By comparing the address of a LOAD ready for execution with the addresses of all preceding STOREs buffered in the store buffer, ordering conflicts may be resolved. For example, if the addresses of all preceding STOREs have been computed and no match has been found between the address of the LOAD and the addresses of the STOREs, then the LOAD is permitted to execute. If, however, a match exists between addresses, then one of two things must be done: If the STORE having the matching address also has valid execution data, a situation known as "STORE forwarding" exists wherein the LOAD is satisfied by the STORE data residing in the store buffer. Alternately, if the STORE does not have valid execution data, then the LOAD must wait until execution of the STORE so that the needed data can be made available. Still, a problem remains since if the address of any preceding STORE has not yet been computed, execution of the LOAD must wait (i.e., dispatch of the LOAD to an execution unit is "blocked") until the address of each preceding STORE has been computed so that LOAD dependencies can be checked.

The main drawback with this approach to processing memory instructions in an out-of-order machine is that blocking of LOADs results in a significant delay which greatly burdens system performance. Additionally, checking for LOAD dependencies further increases system cost and complexity due to the extra hardware, e.g., separate LOAD buffers, comparison logic, etc.

Thus, there exists a need for some mechanism by which LOAD operations can be speculatively performed. A solution to the problem of speculative execution of LOAD operations would vastly improve system performance by speeding up the execution of memory instructions and obviating the need for extraneous hardware. As will be seen, the present invention provides a method and apparatus for speculatively dispatching and/or executing LOAD operations in a computer system. The invention is also capable of recovering from mis-speculation by preventing invalid data of an incorrectly dispatched LOAD operation from being committed to system state.

SUMMARY OF THE INVENTION

The present invention covers a method and apparatus for speculatively dispatching and/or executing LOAD operations in the memory subsystem of a computer system. In one embodiment, the present invention comprises a memory subsystem having at least a processor coupled to a memory via a bus. The processor is of the type which is capable of performing operations "out-of-order" with respect to an original programming sequence. The processor includes a reservation station for buffering operations until their operands, and data dependencies are resolved, and a reorder buffer for resolving exceptions in sequential order.

According to the invention, LOAD and STORE operations are handled by first dispatching them to respective LOAD and STORE buffers in the memory subsystem. When a LOAD operation is subsequently dispatched for execution, the STORE buffer is searched for STORE operations having unknown addresses. If any STOREs are found which are older (i.e., issued earlier in time) than the dispatched LOAD operation and which have an unknown address, the LOAD operation is tagged with an unknown STORE address identification (USAID). The USAID corresponds to a temporal location identifier of the STORE and denotes its location in the buffer with respect to other LOAD and STORE operations. The USAID identifies the youngest STORE which is both older than the LOAD and which has an unknown address.

In the situation where a STORE operation is dispatched for execution, the LOAD buffer is searched for LOAD operations that have been denoted as mis-speculated loads. These are those LOAD operations that (1) have been tagged with an USAID; (2) are younger than the STORE operation being dispatched; and (3) are currently in execution or have been executed. In this way, mis-speculated LOAD operations are prevented from corrupting the architectural state of the machine with invalid data.

One way this may be achieved, for example, is by discarding all of the operations that are younger than the mis-speculated operation, and excluding the mis-speculated operation from the store buffer, LOAD buffer, reservation station, and reorder buffer. Alternately, the execution results of those LOAD operations tagged with an USAID can be placed in a separate storage location. When it is subsequently determined that the LOAD is a mis-speculated operation, the execution results can be discarded without affecting the system or architectural state.

BRIEF DESCRIPTION OF THE DRAWINGS

The present invention will be understood more fully from the detailed description which follows and from the accompanying drawings which include the following figures.

DETAILED DESCRIPTION

A method and apparatus for speculatively performing LOAD operations is described. In the following detailed description of the present invention numerous specific details are set forth, such as specific number of bits, address sizes, blocking conditions, etc., in order to provide a thorough understanding of the present invention. However, it will be obvious to one skilled in the art that the present invention may be practiced without these specific details. In other instances, well-known structures and devices are shown in block diagram form, rather than in detail, in order to avoid unnecessarily obscuring the present invention.

Overview of the Computer System

Figure 1:
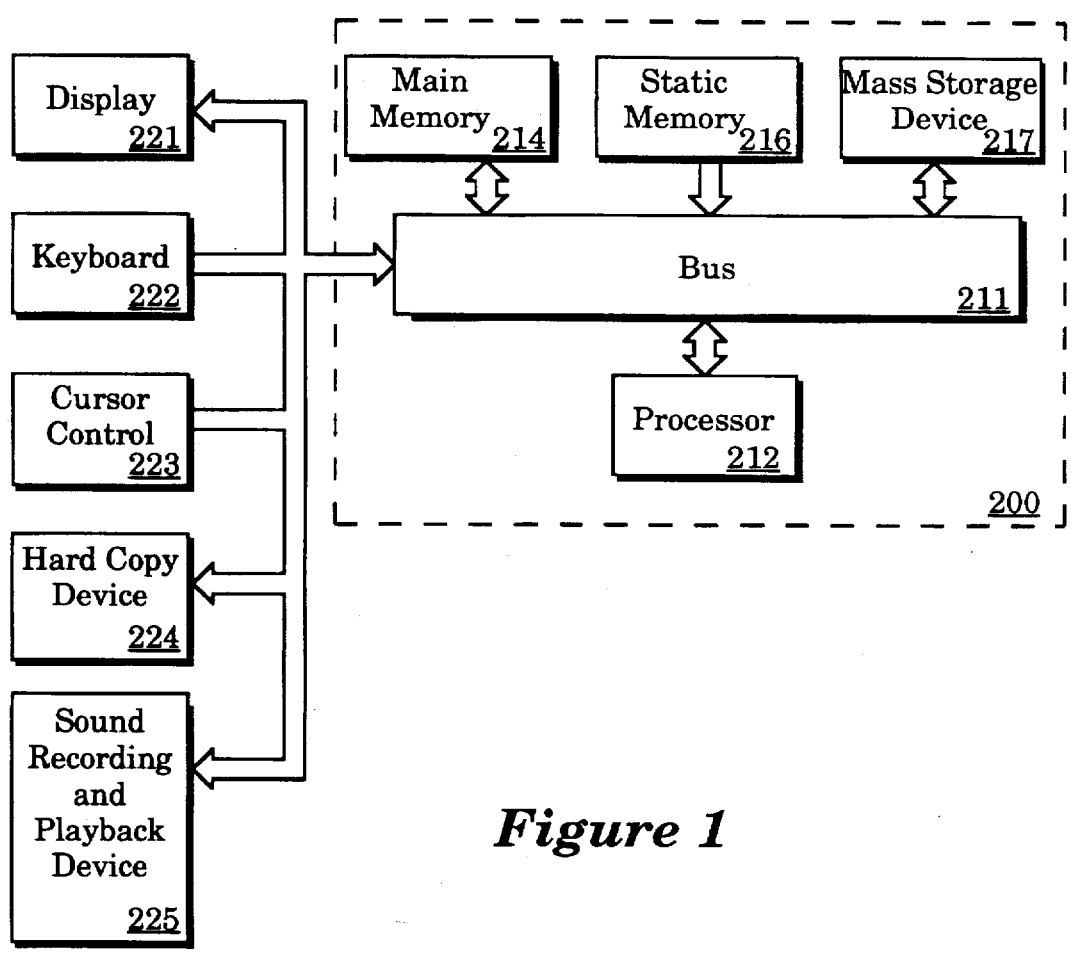
FIG. 1 is a block diagram of one embodiment of the present invention.

Referring to FIG. 1, a computer system 200 of the present invention is shown comprising a bus 211 for transferring information, and a processor 212. Bus 211 is shown coupled to processor 212, memories 214 and 216, and storage device 217. By way of example, processor 212 may comprise a microprocessor from the x86 family of processors manufactured by Intel Corporation of Santa Clara, Calif. In other embodiments, processor 212 may comprise microprocessors such as the PowerPC™, Alpha™, Nexgen 586™ or other similar machines.

Computer system 200 further comprises a main memory 214 which includes RAM for storing information and instructions to be executed by processor 212. Main memory 214 also may be used for storing temporary variables or other intermediate information for processor 212.

FIG. 1 also illustrates computer system 200, a static storage device 216 (e.g. ROM) coupled to bus 211, and a mass storage device 217, which ordinarily comprises a magnetic or magneto-optical disk drive unit. Mass storage device 217 is also shown connected to processor 212 via bus 211.

In most applications, computer system 200 is connected to a display device 221, such as a cathode ray tube (CRT) or liquid crystal display (LCD) for visual displaying of data and other information. A keyboard, or other input device 222, is also shown coupled to bus 211 for communicating input information and command selections to processor 212. Other user input devices such as cursor control 223—which may include a mouse, trackball, stylus, or cursor direction keys—may be used as input or cursor control devices for processor 212.

A typical system may also include a hard copy device 224 for printing instructions, data, or other information.

The Memory Subsystem

Figure 2:
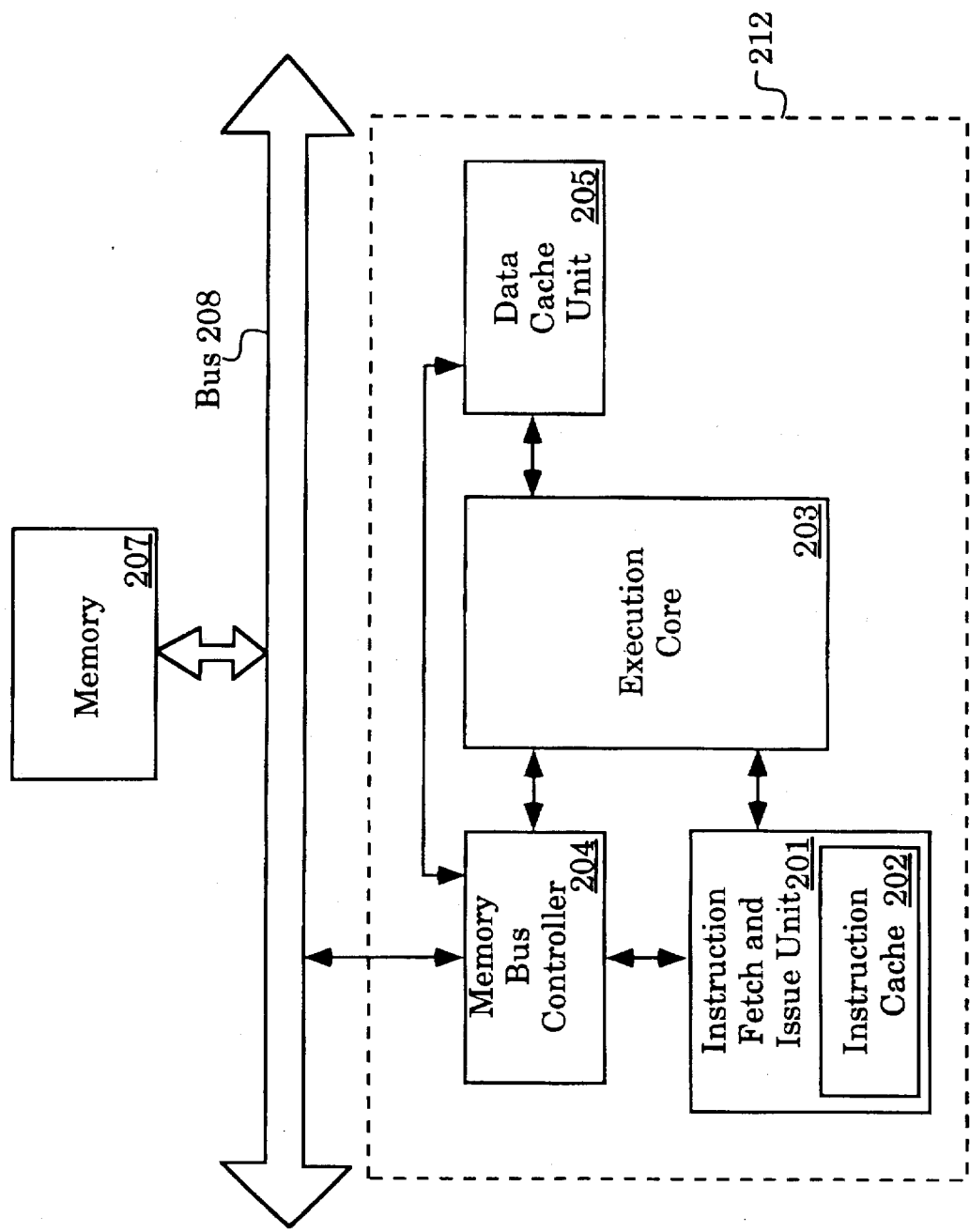
FIG. 2 is a block diagram of the memory subsystem of the processor shown in FIG. 1.

With reference now to FIG. 2, there is shown a block diagram of the memory subsystem of computer system 200. The memory subsystem includes an instruction fetch and issue unit 201 having an integrated instruction cache 202. Also included is an execution core 203, a bus controller 204, a data cache 205, a memory unit 207, and a bus 208. The instruction fetch and issue unit 201, the execution core 203, the bus controller 204, and the data cache 205 may advantageously be integrated on the same semiconductor substrate as processor 212.

Note that bus 208 may be the same as bus 211 of FIG. 1; alternatively it may comprise a local bus (e.g. PCI bus) or other intermediate bus level that is bridged or otherwise coupled to bus 208. Similarly, memory 207 may comprise any of memory devices 214, 216 or 217 shown in FIG. 1. Alternatively, memory 207 may comprise another storage element in the memory hierarchy such as a secondary (L2) data cache.

In accordance with one embodiment of the present invention, elements 201–205 to fetch, issue, execute and store the execution results of instructions in a pipelined manner. The instruction fetch and issue unit (IFU) 201 fetches instructions from an external memory, such as memory unit 207, through bus controller 204 via bus 208. The fetched instructions are stored in instruction cache 202. Bus controller 204 manages transfers of data between external components and processor 212, as well as managing cache coherency transfers. IFU 201 issues the fetched instructions in their original program order to execution core 203. Execution core 203 performs arithmetic and logic operations, such as add, subtract, multiply, logical operation (e.g., AND, OR) and memory operations. Some instructions are also fetched and issued speculatively.

With respect to memory operations, data cache 205 responds to LOAD instructions immediately by forwarding data, if necessary; STORE instructions are buffered. In other words, memory instructions are not necessarily executed or forwarded in the order they originally were issued. In the processor embodied in FIG. 2, some instructions are speculatively executed. It should be understood, however, that the execution results of integer, floating point and LOAD instructions are first buffered, and then later committed to an architectural state of the processor in original program order. Buffered STORE instructions are also committed to an architectural state in original program order. In accordance with one embodiment of the present invention, speculative results of integer, floating point and LOAD operations, and also buffered STORE data of mis-predicted branches, may be discarded or "purged" from the pipeline before their retirement. Retirement is the active process of removing a completed operation from the reorder buffer and committing its state to whatever permanent architectural or system state is designated by the original instruction.

Figure 3:
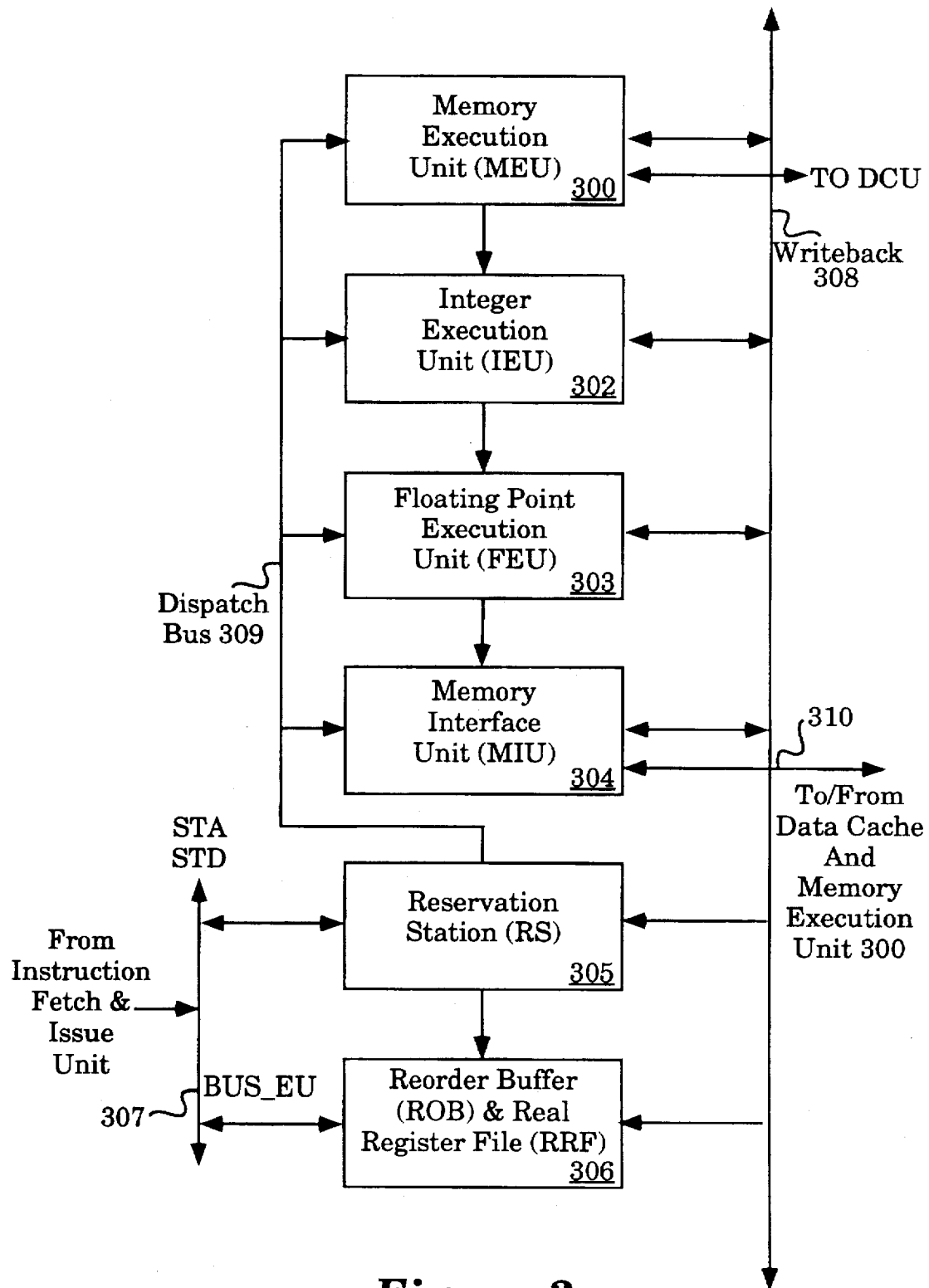
FIG. 3 is a block diagram of an execution unit.

FIG. 3 illustrates details of the execution core 203 of one embodiment of the present invention. Execution core 203 comprises a reservation station (RS) 305, a memory execution unit MEU 300, an integer execution unit (IEU) 302, a floating point execution unit (FEU) 303, a memory interface unit (MIU) 304, and a reorder buffer (ROB) and real register file (RRF) 306. Additionally, execution core 203 includes an internal bus (Bus_EU) 307 and a writeback bus 308. The MEU 300, AGU 301, IEU 302, FEU 303 and MIU 304 are coupled to RS 305 via dispatch bus 309, and are further coupled to writeback bus 308. MIU 304 is coupled to the data cache memory and MEU 300 via bus 310. RS 305 is coupled to the writeback bus 308 and to Bus_EU 307. RS 305 is also shown coupled to ROB and RRF 306. Furthermore, ROB and RRF 306 is also coupled to the Bus_EU 307 and the writeback bus 308. Elements 300–310 operate together to hold, dispatch, execute and commit execution results of instructions. Note that execution core 203 may include multiple IEUs and/or FEUs.

Because out-of-order instruction execution may cause the overwriting of a value in a register that a previous instruction needs for its execution the present invention employs a concept known as "register renaming". In register renaming, additional "surrogate" registers are used to reestablish correspondence between registers and values. These surrogate or physical registers are associated with the original logical registers and values needed by the program. To implement register renaming, the processor may allocate a new physical register for every new value produced, i.e., for every instruction that writes to a register. An instruction identifying the original logical register for the purpose of reading its value obtains instead the value in the corresponding physical register. Thus, the hardware renames the logical register identifier in the instruction to identify the physical register that contains the correct value. The same register identifier in several different instructions may actually access different physical registers depending on the location of the register references with respect to the register assignments.

To support register renaming, the result value of a decoded instruction is normally assigned to a physical register in the ROB. The operation's original destination register is associated with this physical register. When a subsequent instruction refers to the original destination register to obtain the value it believes is stored in the register, this subsequent instruction obtains instead the value stored in the ROB register if that value has been computed.

The logical registers specified by the decoded instruction are assigned to the ROB registers and a register alias table keeps track of such assignments. The use of register renaming in the ROB not only avoids register resource dependencies to permit out-of-order execution, but also plays an important role in speculative execution. If the instruction sequence given above is considered to be part of a predicted branch, then execution of those instructions using the ROB registers has no effect on the logical registers denoted by an instruction. Thus, if it is determined that the branch was mis-predicted, the results calculated and stored in the ROB may be erased and the pipeline flushed without affecting the logical registers found in the processor's real register file (RRF). If the predicted branch affected the values in the RRF, then it would be impossible to recover from branch mis-prediction because the values stored in the logical registers before the predicted branch was taken could not be determined without the use of redundant registers in the ROB.

As instructions are executed out-of-order, a given logical register may be written many times. Thus, different instructions may cause the same register identifier to be written into different ROB registers through renaming since the instructions specify the same logical register. To obtain the correct value when this happens, the ROB prioritizes multiple matching entries by order of allocation and returns the most recent entry for use by subsequent instructions. When a result is produced, it is written to the ROB and to any entry of the RS representing the logical register. When the value is written into the RS, it may provide an input operand to one or more waiting instructions buffered in the RS, freeing the instructions to be dispatched to one or more EUs. After the value is written into the ROB, subsequent instructions continue to fetch the value from the ROB unless the entry is superseded by a new ROB register assignment and until the value is retired by writing it to the RRF.

Retirement occurs in the order of the original program instruction sequence after execution of the instructions. After the processor determines that the predicted instruction flow is correct, the processor commits the speculative results of the instructions that were stored in the ROB to an architectural state by writing the results to the RRF. The register alias table then updates its records to indicate the reassignment of the values to the RRF.

With continued reference to FIG. 3, RS 305 receives and stores the issued instructions resolving the operands with data from the IEU 302, FEU 303, data cache memory, and ROB and RRF 306. The RS 305 then dispatches the issued instructions to the address generation unit (AGU) 301 (see FIG. 4), IEU 302, FEU 303, MIU 304 and MEU 300.

LOAD instructions are dispatched as single operations, but each STORE is dispatched as a STORE address (STA) operation and a stored data (STD) operation to MEU 300 and MIU 304. Similar to instruction fetching, there is no requirement that the LOAD sources or the STORE destinations be aligned to memory locations. In other words, the LOAD sources of LOAD instructions and STORE destinations may span two or more cache lines (or pages).

MIU 304 of the execution core 203 comprises a store converter coupled to a store data buffer. The store converter converts the floating point data of the STORE data operations received from RS 305 and sends data to the store data buffer. The data in the store data buffer of MIU 304 is eventually stored in the data cache 205. The store data buffer of MIU 304 receives and stores the STORE data operations, and in cooperation with PAB 600 of data cache 205, retires/ commits the STORE data operations as appropriate.

Figure 4:
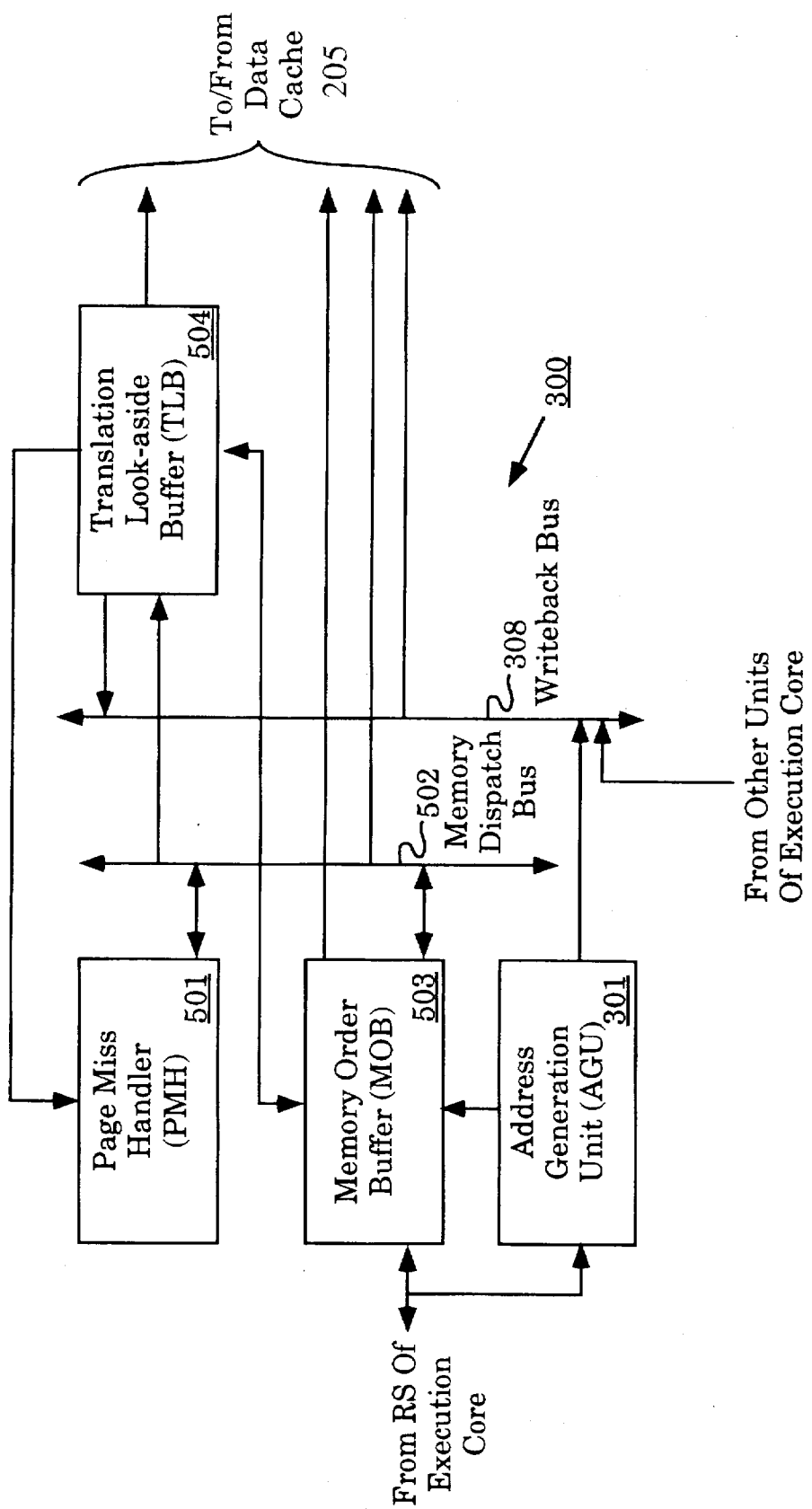
FIG. 4 is a block diagram illustrating portions of a cache controller.

FIG. 4 is a block diagram of one embodiment the of the memory execution unit (MEU) of the present invention. Referring to FIG. 4, the MEU 300 includes AGU 301, page miss handler (PMH) 501, memory order buffer (MOB) 503, and translation look-aside buffer (TLB) 504. Also included are memory dispatch bus 502 and writeback bus 308. PMH 501 is coupled to the memory dispatch bus 502, writeback bus 308, and TLB 504. MOB 503 is coupled to the RS, memory dispatch bus 502, writeback bus 308, data cache 205 and TLB 504. TLB 504 is also shown being coupled to memory dispatch bus 502, writeback bus 308 and data cache 205. Memory dispatch bus 502 and writeback bus 308 are also coupled to the data cache memory. To complete the connections of FIG. 4, AGU 505 is shown coupled to MOB 503, writeback bus 308, and memory dispatch bus 502.

AGU 301, MOB 503, PMH 501, and TLB 504 control LOAD accesses to the memory hierarchy of the computer system and execute the STA portion of STOREs. Specifically, MOB 503 buffers the results of the STA execution for the eventual STORE dispatch to the data cache memory. AGU 301 generates the appropriate linear address for the memory operations using a base address, a displacement value, a scale value, an index value and a segment value. In one embodiment, the linear address is 32-bits long with the 20 highest order bits identifying a memory page, and the 12 lowest order bits identifying the offset within the memory page.

TLB 504 translates the 32-bit linear address into a 36-bit physical address with the 24 highest order bits indicating the memory page. TLB 504 also forwards misses to PMH 501. In response, PMH 501 performs page walking and other well known page miss handling functions. MOB 503 controls dispatching, buffers STORE (i.e. address) and LOAD operations, tracks memory operation progress through execution and the retirement process.

Additionally, MOB 503 responds to LOAD operations by forwarding buffered data as needed. When, for example, a LOAD operation is dispatched and cannot complete due to a resource conflict, MOB 503 blocks the operation and store dependency information. MOB 503 then redispatches the blocked operations once the conflict has been removed.

Note that some memory operations cannot be executed speculatively. In these cases, MOB 503 dispatches non-speculative operations at the correct time. To do this MOB 503 snoops the source addresses of instructions that have been fetched and generates a signal for the bus controller to stall an instruction fetch whenever the source address instruction being fetched matches any of the addresses of the STORE destinations of the buffered STORE instructions.

Figure 5:
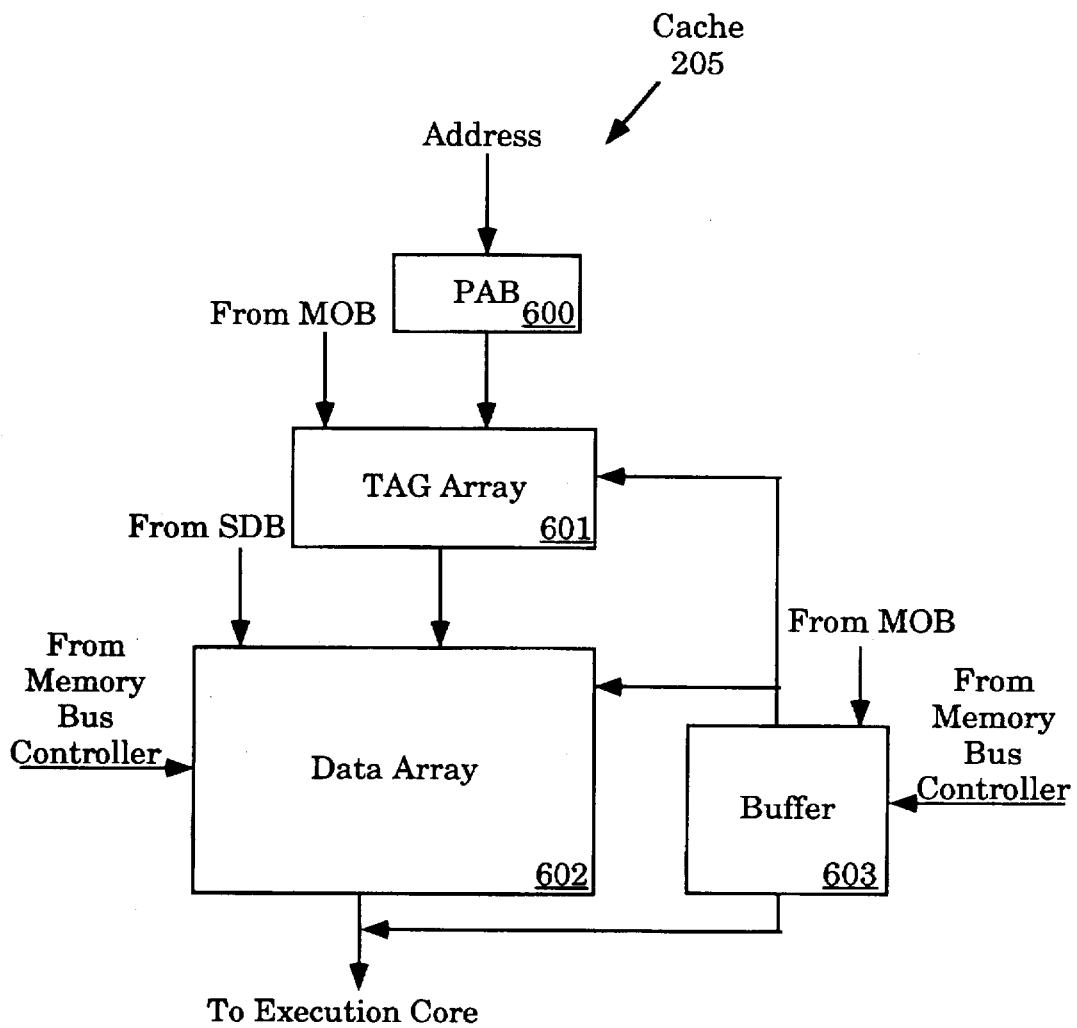
FIG. 5 is a block diagram illustrating portions of a data cache.

FIG. 5 is a block diagram of one embodiment of data cache 205 of the present invention which is shown comprising a physical address buffer (PAB) 600, data tag array 601, data array 602, and queue buffer 603. PAB 600 receives physical addresses from TLB 504 and outputs these addresses to tag array 601. Tag array 601 also receives either STORE or LOAD addresses from MOB 503. Data array 602 is shown receiving inputs from tag array 601, the store data buffer (SDB) of MEU 300 and memory bus controller 204. In response, array 602 outputs data to execution core 203. Queue buffer 603 is also shown coupled to tag array 601 and data array 602, and receives its inputs from the MOB 503 and bus controller 204.

In one implementation, PAB 600 receives and saves the 24 highest order bits of the translated physical address for STORE and LOAD operations. In cooperation with the MOB 503 and MIU 304, these addresses are executed at the appropriate time. Tag array 601 stores the physical address tags of the data currently being cached in data array 602 and tag matches the accessing physical addresses against the stored physical address tags. Data array 602 receives and stores the data currently being cached and responds to data LOADs. In the embodiment of FIG. 5, tag array 601 and data array 602 store 128 sets of 2-way set associative 32-byte cache lines of data and their corresponding address tags.

Queue buffer 603 stores accesses to data cache 205 that miss the cache memory and are currently pending on bus 208. The entries in queue buffer 603 are checked whenever the data cache is accessed to determine if the desired data is already present in buffer 603, or whether there is a pending request for that cache line on the bus. Queue buffer 603 also includes storage locations for temporarily storing data returned from pending operations. Buffer 603 supplies the data and its associated tag information to data array 602 and tag array 601, respectively. In one embodiment, the buffer 603 includes four, 256-bit wide entries.

Figure 6:
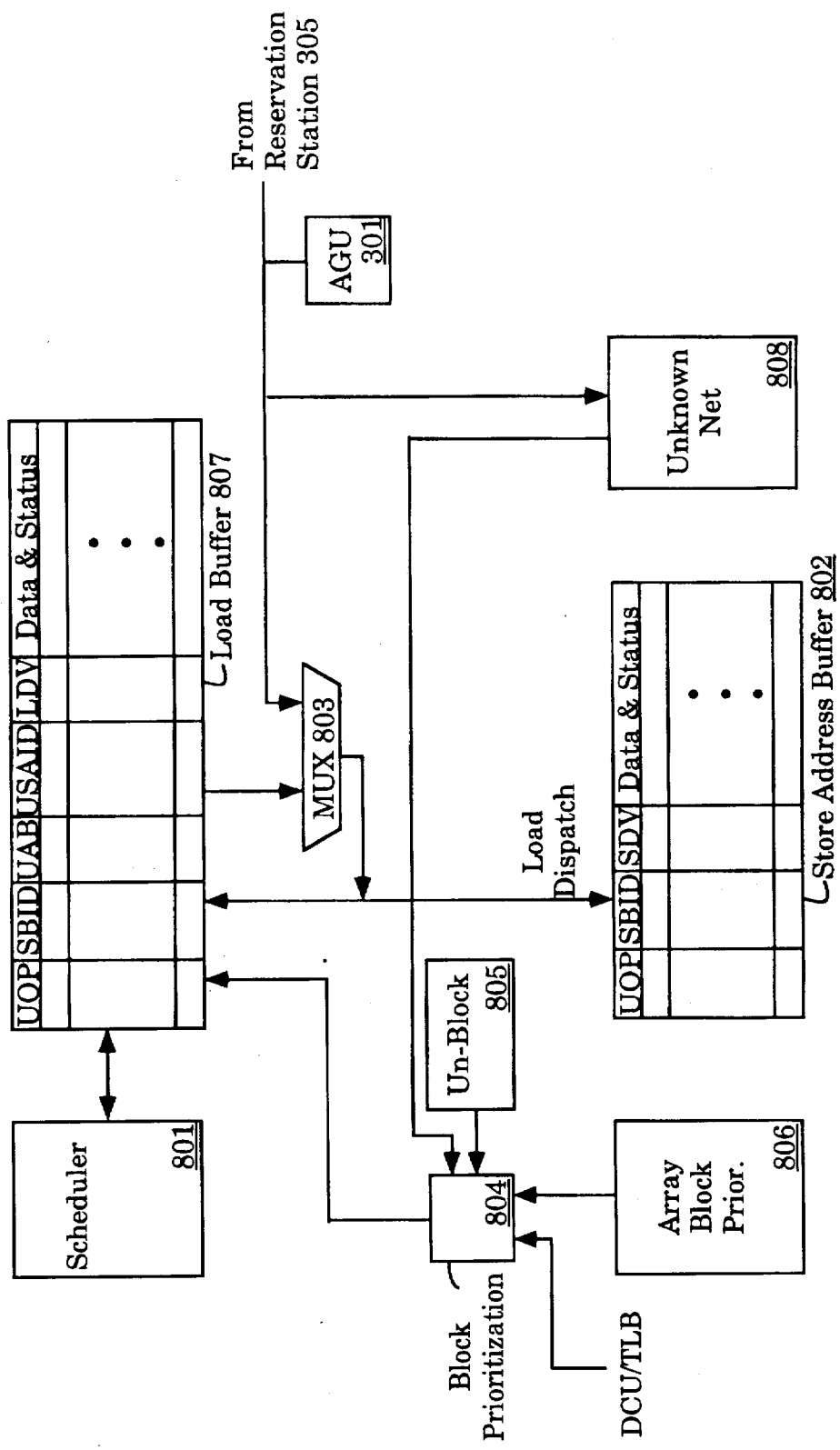
FIG. 6 is a block diagram which shows portions of a memory ordering buffer utilized in one embodiment of the present invention.

FIG. 6 is one embodiment of the memory order buffer (MOB) which includes scheduler 801, LOAD buffer (LB) 807, multiplexer (MUX) 803, block prioritization logic 804, unconditional block 805, block prioritization array 806, STORE address buffer (SAB) 802 and unknown net unit 808. Scheduler 801 schedules LOAD operations for dispatch to memory based on their status and is shown in FIG. 6 being coupled to LB 807, which, in turn, is coupled to block prioritization unit 804, store address buffer (SAB) 802 and multiplexer 803. Block prioritization unit 804 also receives data from TLB 504, cache 205, unknown net unit 808 and MUX 803, also coupled to RS 305 via dispatch bus 309.

SAB 802 stores the remaining operands and partial replications of the page denoting portions of the STORE destination addresses of buffered STA operations. In cooperation with the store data buffer of MIU 304 and PAB 600, SAB 802 retires/commits the STA operations as appropriate, and causes them to be dispatched to memory.

LB 807 also is coupled to receive a copy of the LOAD operations dispatched from RS 305 via MUX 803 and provides the stored LOAD operations to TLB 504 and the execution pipe upon dispatch. MUX 803 receives LOADs from LB 807 and dispatch bus 309 and outputs one LOAD dispatch.

Unknown net unit 808, unconditional block 805, and array block prioritization array 806 determine if a specific set of conditions exist requiring that a particular LOAD operation be prevented from executing. Block prioritization unit 804 comprises ordinary logic that receives conflicts, conditions, and/or identification signals to block LOADs and initiate operations stored in LB 807. Block prioritization unit 804 indicates the status of LOAD operations through signals sent to LB 807.

Figure 7:
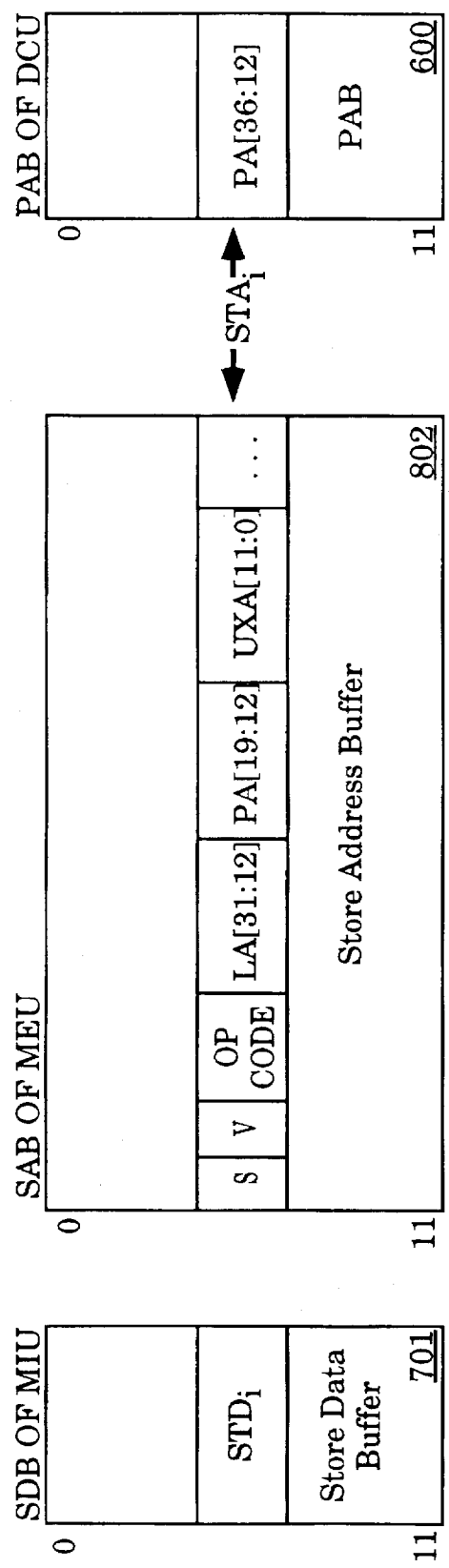
FIG. 7 is a block diagram illustrating a STORE address buffer, a STORE data buffer, and a physical address buffer for one embodiment of the present invention.

Referring now to FIG. 7, there is shown a block diagram of one embodiment of PAB 600, the same STORE data buffer (SDB) 701 of MIU 304 and the SAB 802. The elements PAB 600, SDB 701, and SAB 802 each comprise the same number of buffer slots. For example, in FIG. 7 twelve buffer slots are included. The STD and STA operations of the STORE instructions are stored in corresponding buffer slots of PAB 600, SDB 701 and SAB 802. For instance, the 24 highest order bits of the physical address (PA [36:12]) are stored in the buffer slot in PAB 600. The STD operation is stored in a corresponding buffer slot of SDB 701, whereas the STA operation—including the valid bit, opcode, 20 highest-order bits of the linear address (LA [31:12]), and the 12-bit page offset of the address (UXA [11:0])—is stored in a corresponding buffer slot in SAB 802. Additionally, the 8 lower-order bits of a page designated portion of the physical address (PA[19:12]) of the STA operation are replicated in a buffer slot of SAB 802.

The STD and STA operations of most STORE operations are promoted to a "senior" state (denoting that a senior STORE is ready for retirement) when their respective preceding instructions have all been retired or promoted to the "senior" state. The "senior" STD and STA operations are then executed when the data cache is available; they are then subsequently purged from SDB 701, SAB 802 and PAB 600 at the time they are executed. In other words, when the target I/O devices are ready to accept the data, execution occurs.

LOAD Operations

LOAD instructions received by IFU 201 are decoded and sent to RS 305 for subsequent dispatch to the memory subsystem after resolution of any data dependencies. Concurrently, entries for the instruction are allocated in LB 807, SAB 802, and ROB 306 so that these units may be updated with status information about the instructions' execution status.

Next, the upper 20 bits of the linear address stored in LB 807 are translated by TLB 504 into a physical address. Data cache 205 uses these physical address bits along with the lower 12 bits of the untranslated address to do a tag array look-up and data array read (if needed). If the LOAD hits the cache memory, then the data is read out of data array 602, aligned, and then passed on to a load converter (not shown). The load converter converts the data into the proper internal format recognized by the processor and writes it back on writeback bus 308. If the LOAD misses the cache, a request for data from external memory is made to the bus controller. After the data is retrieved by the bus controller—either from a secondary cache memory or some other external memory—data cache 205 requests a cycle on writeback bus 308 to return the requested data. When the cycle is granted the data is forwarded to the load converter, which drives the data on writeback bus 308 after appropriate format conversion.

Once a LOAD operation has been dispatched from RS 305 to MEU 300 for execution, cache 205 and TLB 504 provide blocking status, while MOB 503 looks to detect one or more conflicts. MOB 503 prioritizes the blocking status conditions and conflict information to determine whether the LOAD operation should be allowed to continue to execute. If the LOAD cannot be completed due to a conflict, it is halted, i.e. blocked, and data cache 205 aborts the LOAD request. In this case, MOB 503 creates a block code identifying the event that must occur, if any, before the LOAD can be completed. Once the identified event takes place, the LOAD operation may be redispatched for execution, however, there is no assurance that the LOAD will complete during the next execution cycle, since it can be blocked again.

Blocked LOAD operations are stored in LB 807. In one embodiment, the LB 807 contains sixteen entries, meaning that a maximum of 16 load operations can be pending in the processor at any given time. Since only one load is dispatched every cycle, MOB 503 must queue LOAD operations that are ready for dispatch. Queuing is implemented in LB 807 by tagging LOADs as they are made ready. The LOAD buffer then schedules for dispatch a ready LOAD each clock cycle.

Thus, memory is organized such that LOADs are dispatched to MEU 300 at a rate of one per cycle. MOB 503 performs multiple LOAD blocking checks during this time to determine if a LOAD can be executed without conflicts (since RS 305 dispatches purely on data dependency). Checking for resource dependencies, MOB 503 prioritizes the blocking conditions to determine the highest priority. A LOAD operation is stored and tagged with the block code and prevented for completion if a conflict exists. When the conditions causing a particular LOAD to be blocked no longer exist, the LOAD is redispatched.

Figure 8:
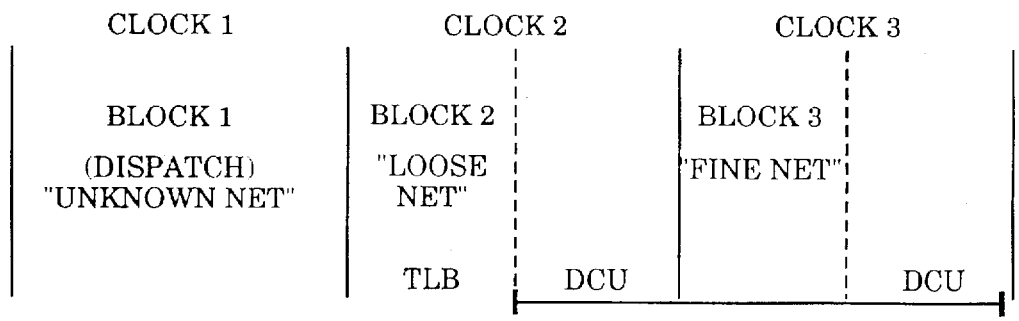
FIG. 8 is a timing diagram of the execution of a LOAD operation.

FIG. 8 illustrates an exemplary timing diagram of a LOAD operation for the present invention. The pipelining of FIG. 8 applies to non-RS LOAD dispatches only). As can be seen, the LOAD operations enters the execution pipeline in a first clock cycle (BLOCK1). In a second cycle, blocking checks (BLOCK2) are performed along with a TLB access. In a third cycle, the remainder of the blocking checks (BLOCK3) are completed. The blocking checks from the second cycle are then grouped into one set together with the blocking checks from the third cycle to produce status bits that indicate whether the LOAD is to be blocked. By the third cycle, the access to the data cache 205 is complete.

It should be appreciated that during the second clock cycle, TLB 504 performs the linear-to-physical address translation in the first half of the cycle. In addition to returning the physical address, TLB 504 also provides status information based on the translation (e.g., translation performed correctly) and the memory type. For example, TLB 504 may indicate that the translation resulted in a fault, a page miss, a blocking condition or a valid linear address. If the address cannot be translated, then a "blocked" status is generated by TLB 504. By way of example, in the present invention, a page miss can occur while the page miss handler is busy. In this situation, the LOAD operation must be blocked. A similar situation arises when there is a linear address miss and a replacement in TLB 504 at the same time. Again, a blocked status is produced for the LOAD operation. It should be understood that the specific conditions which cause TLB 504 to generate a blocked status are dependent on the particular implementation of the paging system.

As explained earlier, during the second cycle, memory type and the physical address is returned. The different memory types include: normal cache speculative memory, uncacheable memory, and non-speculative memory (e.g.

memory mapped I/O). The speculative nature of the memory type depends on whether accesses to that location may be performed out-of-order. If so, then that location is speculative, Otherwise the location is non-speculative, such as in the case of a direct mapped I/O location. The different memory types are ascertained from a set of registers in PMH 501. The memory type for the LOAD is stored in the TLB 504.

Besides the physical address, memory type and TLB 504 status, other signals are generated during the second cycle which are received by MOB 503. Included in this group is a linear address calculation fault signal generated by AGU 301 as a result of a segment violation (or other bus or dependent exception) indicating the linear address is invalid and has a fault.

Also during the second cycle, data cache 205 begins its access using the lower bits of the linear address. The bits utilized are the portion of the address which does not undergo TLB translation. The remainder of the physical address is received early on in the cycle from TLB 504. Cache memory access continues into the third cycle.

If a cache miss occurs, then potentially one of two conditions may exist: a cache block or a squash. A block occurs when the cache memory is unable to buffer the LOAD operation and halts its completion. This is usually caused by multiple memory operations already pending completion on the system bus. A block may also occur for several other reasons. For instance, if there is a pending snoop to the cache line that is being accessed at that time, then a cache block will result. A squash, on the other hand, occurs when there is already an access to the same cache line. Practitioners in the art will appreciate that cache squashers provide a performance gain since a second bus request or buffer does not have to be allocated.

As stated above, during the third cycle, MOB 503 receives all the blocking information status signals and combines them to produce a LOAD status. During this time, the data cache completes its access and sends data to the load converter for final conversion and writeback, unless there is an earlier block or fault signal that aborts the cache memory access.

The status of the LOAD operation is then written into the corresponding entries of MOB 503, LB 807 and ROB 306. LB 807 uses the status bits for each entry to determine when a LOAD operation is ready to execute. If there are no blocks or faults or other similar associated conditions/conflicts, the LOAD operation is sent to data cache 205 and assigned a valid and completed LOAD status. It should be understood that this does not necessarily mean that the LOAD operation has been executed. With respect to the writeback operation to RS 305 and ROB 306, the LOAD operation is not considered completed because there may have been a cache miss. But the LOAD is considered completed from the perspective of MOB 503 and no further action needs to be taken.

If a fault occurs with respect to the LOAD operation, it is marked as valid and completed. Note that these faults may be indicated by the TLB 504 or an AGU 301. The LOAD may not have actually happened, but as far as MOB 503 is concerned the operation is complete. If a page miss occurs, then the LOAD operation is marked invalid, and PMH 501 processes the miss and then redispatches the LOAD.

To summarize, the valid blocked status is a function of multiple conditions and conflict determinations. MOB 503, TLB 504 and data cache memory unit 205 provide the information to determine whether or not the status should be blocked or not. These different conditions are prioritized to allow a general information field for determining when to redispatch a LOAD operation.

LOADs Bypassing STOREs

Dispatch of a LOAD operation results in allocation of a buffer location in LB 807. At the same time, a location is allocated in ROB 306, where eventually, related status information and execution data for the LOAD is stored. Due to possible address dependencies between LOAD and STORE operations, more recently issued (i.e., younger) LOADs are generally not allowed to bypass older STOREs due to the fact that the younger LOADs may obtain "stale" data if a previous STORE has not yet completed. Accordingly, the present invention provides a mechanism for determining the precedence of LOAD and STORE operations that are buffered within the MOB 503. This is accomplished by assigning to each STORE operation issued from the IFU a STORE "color" or store buffer identification (SBID).

The SBID is assigned during decoding. In one embodiment, the SBID includes five bits (which includes a wrap bit) that points the entry in the store buffer where the most recent STORE operation resides until it writes to memory. Store buffer entries are allocated sequentially as STORE operations are issued. Each LOAD operation is tagged with the SBID of the most recent STORE operation. Thus, the SBID assigned to the LOAD operation defines the youngest STORE operation that is older than the LOAD operation itself.

Identifying STORE operations that are older than a particular LOAD operation makes it possible to flag dependencies. By identifying dependencies the present invention uses the temporal locality of LOAD operations with respect to STORE operations to determine whether a particular LOAD operation is being speculatively dispatched for execution. That is an execution should occur before that of an older STORE operation in SAB 802 of MOB 503. In the presently described embodiment speculative dispatch and execution of the LOAD only occurs when STORE operations older than the LOAD do not have addresses that have been calculated and which are valid. If a STORE address is known, and an addresses match occurs, then the invented concept of STORE forwarding immediately satisfies the LOAD operation with the data operand of the youngest STORE operation (which is older than the LOAD).

In STORE coloring operations, each STORE is entered in SAB 802. When a load is dispatched, the store color of the load operation (i.e., the SBID) points to a particular entry in the store buffer. Since SAB 802 has a finite number of entries, the buffer includes an additional bit which indicates whether the buffer is implementing a wraparound feature. That is, after the last store buffer entry is allocated, the present invention continues allocation from the top of the buffer. SAB 802 also includes a tail pointer which points to the oldest store operation in the machine.

During the first cycle of dispatch the store buffer is examined for unknown store addresses that are older than the particular load operation. This is performed utilizing the SBID of the load operation. The STA entries in the buffer (where each STA is an operation that produces the destination address of a STORE operation) are checked to determine which STORE operations having unknown addresses are older than the LOAD operation being dispatched for execution. A content addressable match (CAM) detection scheme is utilized to search SAB 802 from the tail pointer (i.e., the oldest STORE) to the STORE operation pointed to by the SBID assigned to the LOAD operation. This region of STOREs is referred to as the tail region. If an entry having an unknown address is detected, an unknown net signal is asserted for that particular SBID. This sets an unknown address bit (UAB) in the buffer location of LB 807 corresponding to that particular LOAD operation (i.e. that location identified by its assigned SBID). The UAB is set to a logical "0" when the address is unknown and a logical 1 when it is known, i.e., valid and calculated. Additionally, the LOAD operation is tagged with an unknown STORE address identification (USAID) comprising the SBID of the STORE operation having the unknown address.

When multiple STORE operations having unknown addresses exist, the USAID forms the SBID of the youngest STORE operation in the tail region of SAB 802 older than the LOAD operation itself. This USAID is written into the LB 807 location of the LOAD along with the UAB. Alternatively, either may be used separately to indicate the occurrence of a speculative dispatch. When an SBID forming the USAID is used by itself, the USAID is written into a special field of LB 807 that indicates that LOAD is being speculatively dispatched for execution.

Figure 9:
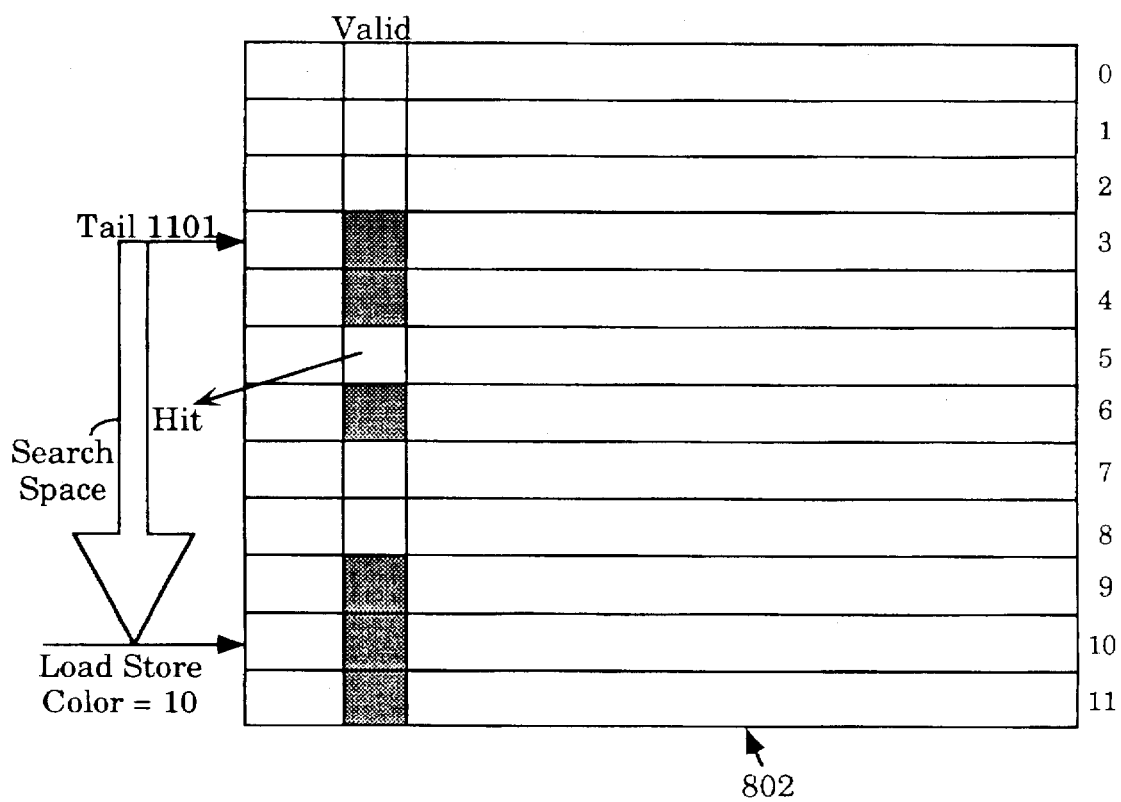
FIG. 9 illustrates the STORE address buffer and the tail pointer utilized in one embodiment of the present invention.

FIG. 9 shows how store buffer entries take part in what is called all "unknown net check". In the example of FIG. 9, tail pointer 1101 of SAB 802 is at entry 3, and the store buffer contains valid STA operations in entries 3, 4, 6, 9, 10 and 11 (indicated by the shaded valid entry locations). A LOAD operation with a STORE color of 10 is dispatched from RS 305. In this case the tail region extends from entry 3 down to entry 10, the LOAD operation's SBID. The first invalid STA operation is entry 5, so that this is the SBID which is returned.

Figure 10:
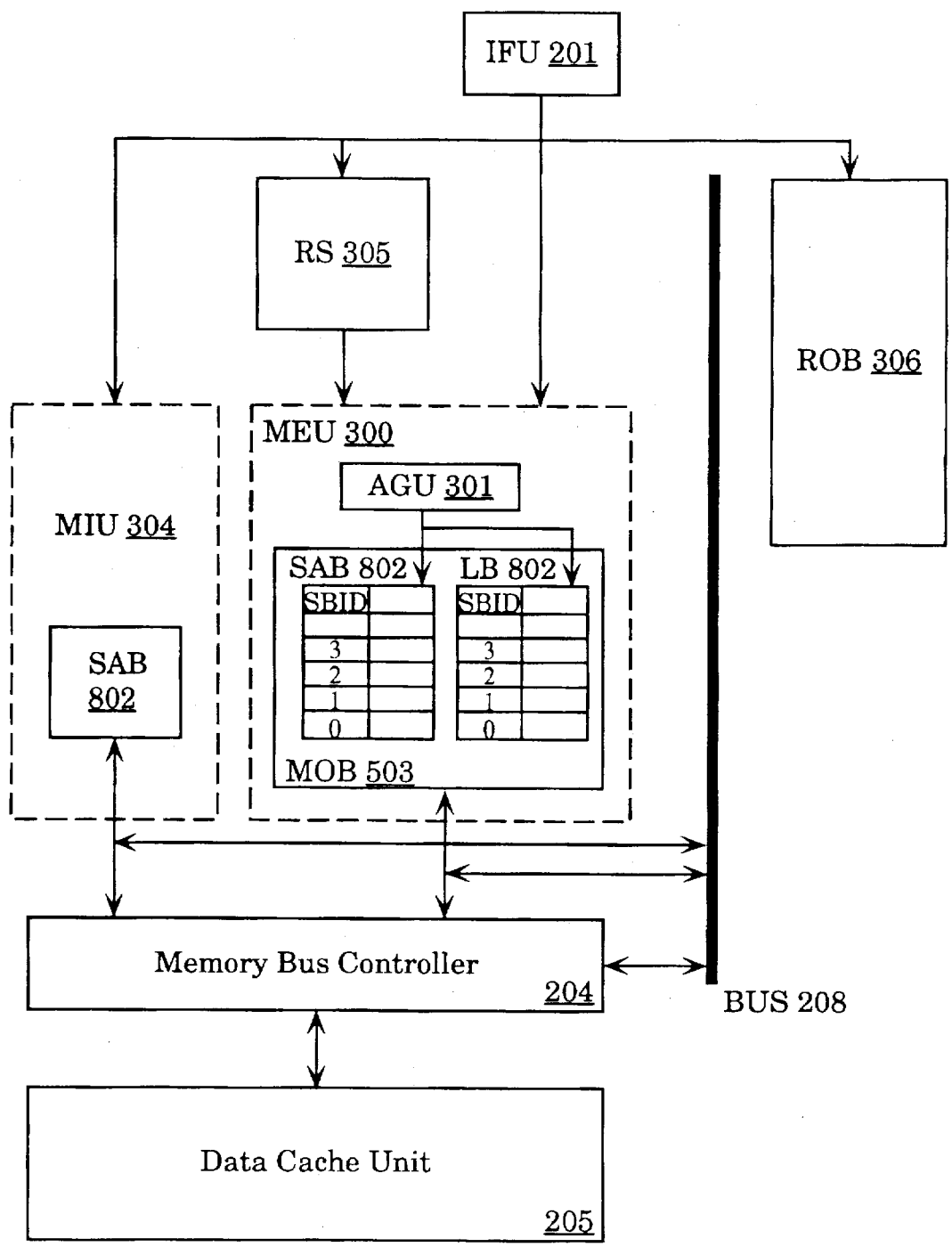
FIG. 10 is a block diagram illustrating details of the memory subsystem of one embodiment of the present invention.
Figure 11:
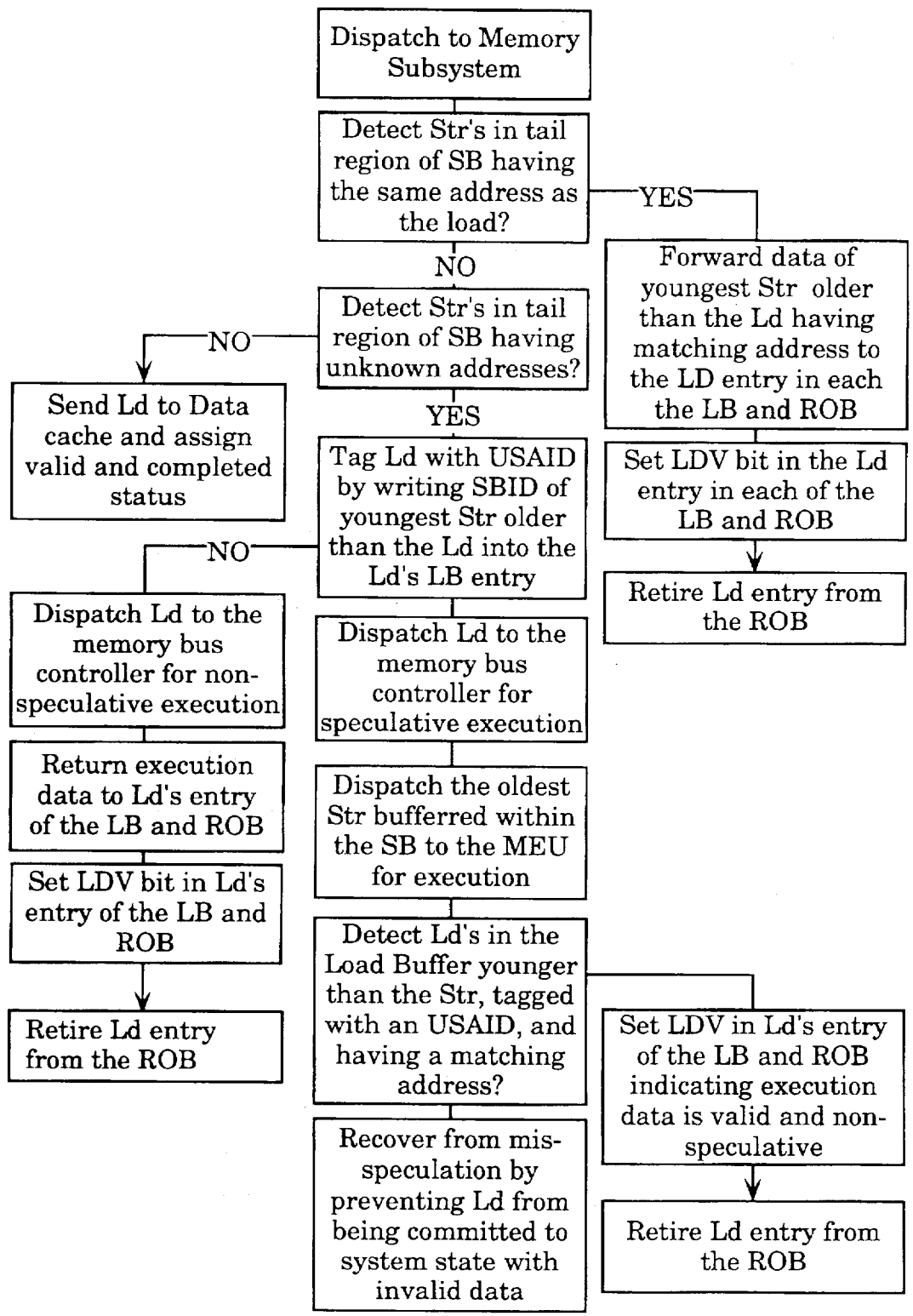
FIG. 11 is a flow chart diagram which describes one aspect of operation for one embodiment of the present invention.

Referring now to the flow diagram of FIG. 11 and the portions of memory subsystem shown in FIG. 10, an exemplary operation of the present invention will be described. Upon dispatch from RS 305, LOAD and STORE operations are sent to AGU 301 for address calculation. At the same time, corresponding entries are allocated within MOB 503 and ROB 306. STORE operations, are automatically buffered in their allocated entry locations in the SAB 802 of MOB 503 where they wait for sequential dispatch to a memory bus controller for scheduling and execution. This takes place when it is determined that the STORE operation being dispatched has a valid address and is the oldest STORE operation in SAB 802. In accordance with the presently described embodiment, this is the STORE address portion of the STORE operation. The STORE data portion is similarly dispatched to the store data buffer of MOB 503 where it awaits for the STA to be issued from the SAB 802, at which time it is also issued from the store data buffer to the memory/bus controller. (To simplify the discussion only a single STORE operation is referred to below.)

LOAD operations, on the other hand, are not automatically buffered in LB 807 since they are first compared with or "snooped against" STORE operations residing in the SAB 802 (by CAM detection) to determine whether STORE forwarding is possible. If a STORE operation within SAB 802 has a known address which matches the address of a LOAD operation, then the STORE operation is written into the entries of the LOAD operation in LB 807 and ROB 306. Additionally, a bit is set for each entry denoting that the entry is valid. If STORE forwarding is not possible, then the LOAD operations are buffered in the locations allocated for them in LB 807. However, due to the provision of speculative LOAD operation dispatching, it is possible that other embodiments might not implement LB 807 of MOB 503, although this could slow dispatch from RS 305 due to memory access latencies.

Upon dispatch from LB 807, the LOAD operation is again snooped against SAB 802 to determine whether the LOAD operation is being speculatively dispatched for execution. This is accomplished by detecting the STORE operations residing in the tail range of SAB 802 and which have all unknown address. If none are found, the LOAD operation proceeds to the memory/bus controller for eventual access to memory. If one or more STORE operations meeting the above criteria are detected, the LOAD operation is tagged with an USAID forming the SBID of the youngest STORE operation that is older than the LOAD operation. The SBID is written into a special field within LB 807 and also ROB 306, denoting that an unknown STORE address has been detected for this particular LOAD operation. The LOAD operation then proceeds to the memory/bus controller for eventual access to memory.

In order to prevent mis-speculation of the LOAD operation's dispatch causing invalid data to be committed to system state upon its retirement from ROB 306, the present invention also implements a way to recover from such mis-speculation. In one embodiment, this is accomplished by first snooping a subsequently dispatched STORE operation against the LOAD operations in LB 807. A CAM detection between the SBID of the STORE operation and the UAID's forming the SBID's assigned to the LOAD operations in LB 807 is performed to determine if any of the LOAD operations speculatively dispatched for execution did have an address matching that of the STORE operation now being dispatched.

If one or more matches occur, this means that one or more LOAD operations were incorrectly dispatched for execution. Accordingly, a "purge" bit is written into the entry of ROB 306 corresponding to the oldest LOAD operation within the LB 807 having a match. When the LOAD operation eventually comes up for retirement since the purge bit is set for the corresponding entry in ROB 306 that loads operation's entry and all subsequently buffered entries (i.e., those newer or younger than the load operation) within ROB 306 are discarded. The IFU is then signaled to restart fetching instructions from the location in microcode where the load operation originated.

In an alternate embodiment, upon the occurrence of a match within LB 807, the STORE operation which detected a LOAD operation having a matching address is sent to the memory/bus controller The matching LOAD operation is then re-dispatched so as to obtain the correct or valid data now residing at the mutual memory location. Alternately, the valid data held by the STORE may be forwarded to the matching LOAD operation to obviate the extra memory access. However, since the initial execution data obtained by the LOAD operation may have been subsequently used by other younger operations, a purge bit is written into the entry of ROB 306 corresponding to the next youngest operation following the LOAD operation (i.e., that entry having the next highest SBID). In this manner, the LOAD operation (which now has valid data) is retired from ROB 306 in due course, while the purge bit set in the entry of the next youngest operation causes the retirement logic to discard that entry and all other younger entries in ROB 306.

In yet another alternate embodiment, execution of the load operation may cause a cache miss or other delay. To prevent invalid data from being returned to LB 807 and ROB 306, in this situation when the currently dispatched store operation detects an address match with a LOAD operation speculatively dispatched for execution, the valid bit within the same entry of the LB 807 would be checked to determine whether valid execution data has been written back (i.e., valid bit set). If the valid bit has been set, then the purge bit is set as described above. If the valid bit has not been set, then the writeback of the execution data to the LOAD operation's entry in LB 807 and ROB 306 is canceled.

At this point the LOAD operation obtains its data either by forwarding from the STORE operation or by being re-dispatched for execution once the pending STORE operation is executed. In this latter case, no further purging is required since no subsequent operation relied upon the invalid data.

In still another embodiment, additional storage buffers, each associated with a respective LOAD buffer entry, may be provided within MEU 300 for storing execution data of the LOAD operations upon writeback. When a LOAD operation is dispatched for execution, and one or more unknown STORE addresses are detected in the SAB 802, the unknown address bit (or USAID) signals to MEU 300 that the execution data of the LOAD operation is to be written back into a corresponding storage buffer. In this manner, when a subsequently dispatched STORE operation detects a matching address of a LOAD operation having been speculatively dispatched, the LOAD operation's invalid execution data within the corresponding storage buffer may be discarded. The valid data is then obtained once again either by forwarding it from the STORE operation or by re-dispatching the LOAD operation for execution once the pending STORE operation has been executed. If, on the other hand, no matching addresses are found between the STORE operations being dispatched and a speculatively dispatched LOAD operation, the valid bit of its LB 807 entry is set when the oldest STORE operation younger than the LOAD operation has been dispatched for execution.

What is claimed is:

1. A method of performing memory operations in a computer system comprising the steps of:
   (a) dispatching a load operation having a first address;
   (b) identifying a most recent store operation that was dispatched prior to the load operation and which has an unknown address;
   (c) dispatching a store operation having a second address;
   (d) blocking the load operation in the event that the first address matches the second address of the store operation and the store operation was dispatched earlier than, or at the same time as the most recent store operation; and
   (e) executing the store operation.

2. The method of claim 1 further comprising the step, following step (a), of:
   detecting previously dispatched store operations which have unknown addresses.

3. The method of claim 1 further comprising the step, after step (d) of:
   blocking another load operation which is data dependent upon the load operation.

4. The method of claim 1 further comprising the additional steps, after step (a), of:
   buffering store operations in a store buffer according to a sequential order;
   assigning an identifier to each store operation in the store buffer in correspondence to the sequential order.

5. In a computer system comprising a processor having a data cache, and an external memory coupled to the processor via a bus, a method of executing a program that includes memory operations comprising the steps of:
   (a) buffering store operations prior to their execution according to a sequential order of the program;
   (b) dispatching a load operation having a first address;
   (c) assigning to the load operation a first identifier of a previously buffered store operation which is most recent in the sequential order to the load operation;
   (d) tagging the load operation with a second identifier when the previously buffered store operation identified by the first identifier also has an unknown address;
   (e) dispatching a store operation having a second address;
   (f) blocking the tagged load operation in the event that the first address matches the second address of the store operation and the store operation was dispatched at an earlier or same time than the previously buffered store operator and
   (g) executing the store operation.

6. The method of claim 5 further comprising the step of:
   blocking other load operations tagged with second identifiers of buffered store operations that are earlier in the sequential program order than the previously buffered store operation of the load operation.

7. The method of claim 6 wherein the load operation comprises a mis-speculated load operation.

8. The method of claim 5 further comprising the step of:
   re-dispatching the load operation.

9. The method of claim 5 further comprising the step of:
   storing data associated with the store operation in the data cache.

10. The method of claim 5 further comprising, after step (d), the additional steps of:
    executing the load operation; and
    buffering execution data of the load operation in a storage location.

11. The method of claim 10 further comprising the steps of:
    discarding the execution data of the load operation from the storage location; and
    re-dispatching the load operation.

12. The method of claim 11 wherein step (b) comprises the step of:
    allocating a buffer location in a load buffer for the load operation in accordance with the sequential order of the program.

13. The method of claim 8 further comprising the steps of:
    re-executing a first load operation which is earliest in the sequential order of the program;
    discarding load and store operations dispatched subsequent to the dispatch of the first load operation.

14. The method of claims 5, 6, 7, 8, 9, 10, 11, or 13 wherein the system further comprises a bus controller unit coupled to the bus, and wherein execution of dispatched load or store operations occurs either in the data cache or in the bus controller unit accessing the external memory.

15. In a computer which speculatively executes instructions, a method of executing a program having a sequential order that directs operations in a memory subsystem of the computer comprising the steps of:
    dispatching a load operation and a store operation, the load operation having a first address and an associated set of bits representing a value which identifies a most recent store operation relative to the load operation, the store operation having a second address and an associated identifier (ID) value;

identifying a previously dispatched store operation which is most recent in the sequential order to the load operation, and which has an unknown address, the previously dispatched store operation also having an associated ID value;

detecting whether the value of the associated set of bits of the load operation is the same as, or greater than, the associated ID value of the store operation;

preventing the load operation from executing when the first and second addresses match, and the previously dispatched store operation occurred earlier in the sequential order than the store operation;

executing the store operation; and forwarding execution data of the store operation to the load operation.

16. In a processor which speculatively executes instructions, a method of executing a program having a sequential order that directs memory operations in a functional unit of the processor comprising the steps of:

issuing load and store operations to the functional unit in a sequential order;

assigning an identifier to each issued load and store operation, the identifier corresponding to the sequential order and having a value that increases with each newly issued operation;

allocating a location in a storage buffer for each load and store operation, the location corresponding to the sequential order;

dispatching a load operation having a first address and a first identifier from the storage buffer to a first execution unit of the processor;

detecting buffered store operations having unknown addresses;

tagging the load operation to indicate a previously buffered store operation with an unknown address and which has an associated identifier having a next lower value than that of the first identifier;

executing the load operation;

dispatching a store operation having a second address and a second identifier from the storage buffer to a second execution unit of the processor;

comparing the first and second addresses to determine if they match;

preventing data from the load operation from being committed to a permanent processor state when the first and second addresses match and the second identifier has a value which is the same as or lower than the associated identifier of the previously buffered store operation; and executing the store operation.

17. The method of claim 16 wherein the step of detecting buffered store operations having unknown addresses comprises the step of searching the storage buffer between a first store operation in the sequential order and a location corresponding to the first identifier of the load operation.

18. The method of claim 17 further comprising, after the step of executing the load operation, the step of buffering the data of the load operation in a data storage location.

19. The method of claim 20 wherein the preventing step comprises the steps of:

executing the store operation;

discarding the data of the load operation from the data storage location; and re-dispatching the load operation for re-execution.

20. The method of claim 17 wherein after the step of dispatching a load operation, the method further comprises the steps of:

detecting buffered store operations having valid data and valid addresses which correspond to the first address of the load operation; and forwarding valid data of one of the buffered store operations to the load operation when the one buffered store operations has an associated identifier which is the same or greater than the first identifier.

21. In a processor which speculatively executes instructions, a method of executing a program having a sequential order that directs memory operations in a functional unit of the processor comprising the steps of:

issuing load and store operations to the functional unit in a sequential order;

assigning to each issued store operation, and at least a first load operation, an identifier corresponding to the sequential order, the identifier having a value which is incremented with each newly issued operation;

allocating a location in a storage buffer for each store operation, the location corresponding to the sequential order;

dispatching the first load operation having a first address and a first identifier to a first execution unit of the processor;

detecting buffered store operations having unknown addresses;

tagging the first load operation to indicate a previously buffered store operation with an unknown address and which has an associated identifier having a next lower value than that of the first identifier;

executing the first load operation;

dispatching a store operation having a second address and a second identifier from the storage buffer to a second execution unit of the processor;

comparing the first and second addresses to determine if they match;

data from the first load operation from being committed to an architectural state when the first and second addresses match and the second identifier has a value which is the same as or lower than the associated identifier of the previously buffered store operation; and executing the store operation.

22. A processor comprising:

means for issuing load and store operations;

means coupled to the issuing means for executing the load and store operations;

a memory unit which includes;

means for detecting pending store operations having unknown addresses;

means for tagging a load operation issued by the issuing means with an unknown store address identifier (USAID) identifying a youngest pending store operation which has an unknown address and is older than the load operation in response to the detecting means detecting a pending store operation having an unknown address;

means for generating a signal upon detection of a mis-speculated load operation which has an associated USAID and is younger than the pending store operation; and means for preventing a mis-speculated load operation being committed to an architectural state of the processor in response to the signal.

23. A processor for executing a program which includes instructions arranged in a sequential order, the processor comprising:

a first unit that fetches and issues the instructions in accordance with the sequential order, the instructions specifying various operations which include load and store operations;

a second unit, coupled to the first unit, that executes the various operations in a different order as compared to the sequential order;

a third unit, coupled to the first and second unit, that commits results produced by the various operations to an architectural state of the processor;

a memory subsystem having load and store buffers, which respectively buffer the load and store operations prior to execution, and associated logic;

upon dispatch of a load operation to the second unit, the associated logic being operative to tag the load operation with an identifier value corresponding to a youngest one of the store operations pending in the store buffer which is both older than the load operation and which has an unknown address, as determined by a search of the store buffer; and upon dispatch of a store operation to the second unit, the associated logic being operative to search the load buffer for a mis-speculated load operation, and, in response thereto, prevent the third unit from committing data associated with the mis-speculated load operation to the architectural state of the processor.

24. The processor of claim 23 wherein the mis-speculated load operation has an associated identifier value that is younger than the store operation being dispatched to the second unit, and the mis-speculated load operation is currently being executed, or has been executed.

25. The processor of claim 23 wherein each of the store operations pending in the store buffer have a store buffer identification (SBID) which establishes an ordering of the store operations in the store buffer.

26. The processor of claim 25 wherein the identifier value comprises to the SBID of the youngest one of the store operations pending in the store buffer which is both older than the load operation and which has an unknown address.

* * * * *

UNITED STATES PATENT AND TRADEMARK OFFICE
CERTIFICATE OF CORRECTION

PATENT NO. : 5,751,983
DATED : May 12, 1998
INVENTOR(S) : Abramson et al.

It is certified that error appears in the above-identified patent and that said Letters Patent is hereby corrected as shown below:

Column 16,
Line 18, delete "operator" and insert -- operation --.

Column 18,
Line 40, delete "data" and insert -- preventing data --.

Signed and Sealed this

Ninth Day of September, 2003

JAMES E. ROGAN
*Director of the United States Patent and Trademark Office*